United States Patent Office 3,591,559
Patented July 6, 1971

3,591,559
ALL AROMATIC POLYSULFONAMIDES AND
METHOD OF PREPARATION
Stephanie Louise Kwolek, Wilmington, Del., assignor to
E. I. du Pont de Nemours and Company, Wilmington,
Del.
No Drawing. Filed Aug. 1, 1969, Ser. No. 846,923
Int. Cl. C08g 20/00, 20/20
U.S. Cl. 260—49
5 Claims

ABSTRACT OF THE DISCLOSURE

High molecular weight all-aromatic polysulfonamides are prepared by a solution polymerization of selected monomers and are useful in the preparation of shaped articles (e.g., fibers and films).

This invention relates generally to polysulfonamides and more particularly to high molecular weight all-aromatic polysulfonamides and a process for preparing them.

BACKGROUND OF THE INVENTION

Polymers from aromatic disulfonyl chlorides and diamines are disclosed in the prior art. However, the inherent viscosities of these polysulfonamides are reported to be less than 0.2, which is usually not sufficient to permit their extrusion as continuous filaments.

The polymerization of aliphatic diamines or salts thereof with aromatic disulfonyl chlorides by interfacial polymerization using one of two immiscible solvents for each of the monomers is known. However, this technique is not applicable to the preparation of wholly aromatic polymers due to the low reactivity of aromatic diamines, e.g., p-phenylenediamine, when compared with aliphatic analogs, such as hexamethylenediamine.

SUMMARY OF THE INVENTION

This invention is concerned in part with all-aromatic polysulfonamides having an inherent viscosity greater than 0.7, measured as hereinafter described, and having the recurring structural unit $$-\underset{\underset{O}{\|}}{\overset{\overset{O}{\|}}{S}}-X-\underset{\underset{O}{\|}}{\overset{\overset{O}{\|}}{S}}-\overset{H}{\underset{}{N}}-Y-\overset{H}{\underset{}{N}}-$$

wherein X and Y are divalent aromatic radicals each having at least 2 aromatic rings, wherein 2 of said aromatic rings each have a chain extending bond joined to a sulfonamide linkage.

This invention is also concerned with a method of preparing these all-aromatic polysulfonamides. The process comprises solution polymerizing aromatic disulfonyl halides with aromatic diamines, each having at least two aromatic rings and each having the two reactive groups located on different aromatic rings.

This invention is also concerned with shaped articles that can be prepared from all-aromatic polysulfonamides having an inherent viscosity greater than 0.7, measured as hereinafter described.

DESCRIPTION OF THE PREFERRED EMBODIMENT

Polymer preparation

The aromatic polysulfonamides of this invention can be prepared by polymerizing a variety of aromatic disulfonyl halides with aromatic diamines. Some of the disulfonyl halides and diamines which can be employed are represented by the structural formulae

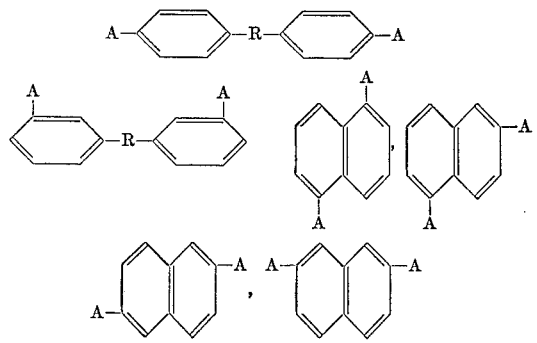

wherein A represents either —NH$_2$ or —SO$_2$X, X representing a halogen radical, preferably chlorine, and R represents either a carbon-carbon bond or a divalent radical selected from the group consisting of oxygen, sulfonyl, and aliphatic hydrocarbon radicals containing up to 5 carbon atoms.

The aromatic rings in the disulfonyl halides and diamines (as well as in the resultant polysulfonamides) may be substituted. Similarly, the aliphatic hydrocarbon radicals containing up to 5 carbon atoms may be substituted. However, the substituents preferably should be non-reactive during the solution polymerization process. Suitable substituents include halogens (e.g., chloro), lower alkyls (e.g., methyl) and the like.

The polysulfonamides of this invention can be prepared using solution polymerization techniques wherein substantially equimolar quantities of disulfonyl halide and diamine are employed in the presence of a suitable solvent and acid acceptor.

Preferred solvents include tetramethylene sulfone, 2,4-dimethyltetramethylene sulfone and 3-methyltetramethylene sulfone. Calcium oxide and hydroxide are suitable acid acceptors.

The polymerization should be carried out under anhydrous conditions to obtain high molecular weight polysulfonamides. The reaction vessel, auxiliary equipment, solvent and monomers are carefully dried prior to use and the reaction vessel is preferably continuously swept with a stream of dry, inert gas, e.g., nitrogen, during the polymerization.

In a preferred process, a solution of the aromatic disulfonyl halide, preferably 4,4'-biphenyldisulfonyl chloride, or of the aromatic diamine, preferably a diamine represented by the formula

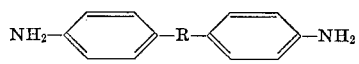

wherein R has the significance hereinbefore defined, is heated to a temperature between 60° and 100° C. When substantially all of the reagent has dissolved, the second monomer is added in one portion. The reaction is allowed to continue for between 0.5 and 1.0 hour prior to adding the acid acceptor and the temperature of the reaction mixture is maintained between 60° and 100° C. throughout the polymerization. Substantially complete polymerization is obtained after 18 to 24 hours at which time the polymer exhibits an inherent viscosity of between about 0.7 and 2.0, measured as described hereinafter.

The polymer can be isolated by precipitation in water or aqueous acid solutions with rapid agitation, after which it is washed several times with water and finally with ethanol.

SOLUTION AND SHAPED ARTICLE PREPARATION

Polysulfonamides that are prepared using the present process can readily be extruded to form filaments using conventional dry and wet spinning techniques. A preferred solvent for spinning is N,N-dimethylacetamide. Optimum tensile properties are developed by drawing the filaments up to about 5× either in an atmosphere of steam or over a surface (e.g., a pin, plate, or shoe) that is heated to a temperature between about 150° and 250° C., after which the filaments exhibit low to medium crystallinity.

Strong self-supporting films are prepared by casting solutions containing between 5 and 25 weight percent of the polymer in a suitable solvent (e.g., N,N-dimethylformamide, N,N-dimethylacetamide, dimethyl sulfoxide, N-methyl-2-pyrrolidone).

In addition ot the useual textile applications, it has been found that filaments and films of the present polymers exhibit characteristics of ion-exchange media and may therefore be useful for water desalinization and related applications.

MEASUREMENTS

Inherent viscosities ($\eta$inh) are determined in accordance with following equation:

$$(\eta_{\text{inh}}) = \frac{\eta_{\text{rel}}}{C}$$

The relative viscosity ($\eta$rel) is determined by dividing the flow time in a capillary viscometer of a dilute solution of the polymer by the flow time for the pure solvent. which is N,N-dimethylformamide. The concentration (C) used in the example is 0.5 gram of polymer per 100 cc. of solvent and the measurements are made at 30° C.

EXAMPLES

The following examples illustrate the novel polymers and polymerization process of this invention and extrusion of fibers from the novel polymers. In these examples all parts and percentages are expressed on a weight basis unless otherwise indicated.

Example I

This example demonstrates one preferred method for preparing a polysulfonamide using bis(4-aminophenyl) methane and 4,4'-biphenyldisulfonyl chloride.

A solution comprising 2.97 g. (0.015 mol) of bis(4-aminophenyl)methane and 30 cc. of tetramethylene sulfone is prepared under a nitrogen atmosphere using a flask which had previously been flame dried and equipped with a stirrer, nitrogen inlet, and a drying tube containing an hydrous calcium chloride. Throughout the polymerization, the flask is partially immersed in an oil bath heated to 60° C. A 5.27 g. (0.015 mol) portion of 4,4'-biphenyldisulfonyl chloride is added to the diamine solution, and the resultant mixture is stirred for one hour, after which 0.84 g. (0.015 mol) of calcium oxide is added. Stirring and heating is continued for an additional 18 hours. The polymer is precipitated by combining the reaction mixture with about 200–300 cc. of a 5% by weight aqueous solution of acetic acid, and the resultant solid is washed twice with water and once with denatured ethanol using a domestic food blender.

After having been dried for 16 hours at 80° C. under reduced pressure and a nitrogen atmosphere, the polymer, obtained in substantially 100% yield, exhibits an inherent viscosity of 0.99.

Colorless, transparent and flexible films have been cast using a 10% by weight solution (in N,N-dimethylformamide) of the polysulfonamide prepared using bis(4-amionphenyl)methane and 4,4'-biphenyldisulfonyl chloride. The film is dried under reduced pressure and a nitrogen atmosphere at a temperature of 100° C.

Example II

This example illustrates a second preferred method for preparing a polysulfonamide derived from bis(4-aminophenyl)methane and 4,4'-biphenyldisulfonyl chloride.

A solution comprising 5.27 g. (0.015 mol) of 4,4'-biphenyldisulfonyl chloride and 30 cc. of tetramethylene sulfone is perpared as described in Example I using an oil bath temperature of 65° C. To the resultant solution is added 2.97 g. (0.015 mol) of bis(4-aminophenyl)methane and after stirring the mixture for one hour, a 0.925 g. portion of calcium oxide is added. The resultant clear viscous solution is stirred for an additional 21 hours after which it is combined with 200–300 cc. of a 5% by weight aqueous solution of acetic acid. The resultant polymer is isolated by filtration, washed three times with water and once with denatured ethanol using a domestic food blender and isolated following each wash.

After drying for 16 hours at 80° C. under reduced pressure and a nitrogen atmosphere the polymer is obtained in 94.1% yield and exhibits an inherent viscosity of 1.06.

Example III

This example iluustrates a second preferred acid acceptor, i.e., calcium hydroxide.

A solution comprising 2.97 g. (0.015 mol) of bis(4-aminophenyl)methane in 30 cc. of tetramethylene sulfone is prepared under nitrogen atmosphere using an oil bath heated to 80° C. A 5.27 g. (0.015 mol) portion of 4,4'-biphenyldisulfonyl chloride is added and the resultant mixture is stirred for 0.5 hour after which time a 1.111 g. portion of calcium hydroxide is added with rapid stirring. The resultant solution is stirred and heated for an additional 21 hours after which time the polymer is precipitated using 200–300 cc. of a 5% by weight aqueous acetic acid solution. The isolated polymer is washed three times with water followed by one wash with denatured ethanol.

The yield of polymer is 92.5% and the inherent viscosity is 0.74.

Example IV

This example illustrates a polysulfonamide prepared using a second preferred diamine, i.e., 4,4'-oxydianiline.

A solution comprising 3.0 g. (0.015 mol) of 4,4'-oxydianiline and 30 cc. of tetramethylene sulfone is prepared using an oil bath temperature of 65° C. Following the addition of 5.27 g. (0.015 mol) of 4,4'-biphenyldisulfonyl chloride, the resultant mixture is stirred for one hour after which a 0.925 g. portion of calcium oxide is added. The stirring and heating are continued for an additional 21 hours after which the resultant viscous gel is combined with 200–300 cc. of a 5% aqueous acetic acid solution and the polymer is isolated and purified as described in Example II.

The polymer is obtained in 93% yield and exhibits an inherent viscosity of 1.09.

Example V

A polymer is prepared as descirbed in Example IV with the exception that the order of addition of 4,4'-biphenyldisulfonyl chloride and 4,4'-oxydianiline is reversed.

The polymer is obtained in 100% yield and exhibits an inherent viscosity of 0.97.

Example VI

This example illustrates a polysulfonamide prepared using 2,2-bis(4-aminophenyl) propane as the diamine.

A solution comprising 5.27 g. (0.015 mol) of 4,4′-biphenyldisulfonyl chloride and 25 cc. of tetramethylene sulfone is prepared using an oil bath temperature of 65° C. To this solution is added an equimolar amount of diamine (3.395 g.) and the resultant mixture is stirred for 1 hour after which time 0.925 g. of calcium oxide is added with rapid stirring. The clear, viscous gel which forms in four hours is allowed to stand for an additional 17 hours. The gel is combined with water in a domestic food blender and the resultant precipitate is washed once using a 5% aqueous solution of acetic acid, followed by 3 washings with water and one with denatured ethanol.

After being dried for 16 hours at 80° C. under reduced pressure and a nitrogen atmosphere, the polymer exhibits an inherent viscosity of 1.96.

Example VII

This example illustrates the preparation of a polysulfonamide using bis(4-aminophenyl) sulfone as the diamine.

A solution comprising 3.725 g. (0.015 mol) of bis(4-aminophenyl)sulfone and 30 cc. of tetramethylenesulfone is prepared using an oil bath temperature of 80° C. To this solution is added 5.27 g. (0.015 mol) of 4,4′-biphenyldisulfonyl chloride and the resultant mixture is stirred for 0.5 hour, after which time 1.26 g. of calcium oxide is added with rapid stirring. Following 18 hours of stirring and heating, the viscous solution is combined with 200–300 cc. of a 5% by weight aqueous solution of acetic acid. The precipitated polymer is washed three times with water and once with ethanol.

After drying for 16 hours at 80° C. under reduced pressure and a nitrogen atmosphere, the polymer is isolated in 71% yield and exhibits an inherent viscosity of 0.77.

Example VIII

This example illustrates the extrusion of fibers from the polysulfonamide obtained in Examples IV and V.

Several portions of the polysulfonamide totaling 30 grams, prepared as described in Examples IV and V using 4,4′-oxydianiline and 4,4′-biphenyldisulfonyl chloride are combined and dissolved in N,N-dimethylacetamide to form a solution containing 25% by weight of polymer. The solution is heated to about 120° C. and extruded through a spinneret containing 10 holes exhibiting a diameter of 0.005 inch (0.0127 cm.) into an atmosphere of nitrogen at a temperature between 184 and 194° C. The resultant fiber is wound up at a rate of 132 yards per minute (120.7 meters per minute). After soaking in water to extract residual solvent the fiber is drawn 2.5× over a hot plate heated to 100° C. followed by a draw of 1.25× through a tube containing nitrogen at a temperature of 190° C.

The resultant filaments exhibited a tenacity, elongation, initial modulus and denier of 2.12 g. per denier, 38%, 36 g. per denier and 2.93, respectively and a low order of crystallinity.

Example IX

This example illustrates the extrusion of fibers from the polysulfonamide obtained in Example VI.

A solution comprising N,N-dimethylacetamide and 30 g. (26% by weight) of polysulfonamide collected from several polymerizations using the reagents and procedure of Example VI is prepared. After heating to about 120° C. the solution is extruded through 0.005 inch (0.0127 cm.)-diameter orifices. The temperature of the nitrogen atmosphere below the spinneret is between 180 and 194° C. After being drawn 4.25× in an atmosphere of steam under a pressure of 12 p.s.i. (850 g./cm.²) the 2.28 denier filaments exhibit a tenacity, elongation and modulus of 1.66 g./denier, 21% and 29 g./denier, respectively.

What is claimed is:

1. In a process for solution polymerizing a disulfonyl halide and a diamine, in the presence of a suitable solvent and acid acceptor under anhydrous conditions to form a polysulfonamide, the improvement wherein said disulfonyl halide and diamine are aromatic compounds having at least two aromatic rings and having each reacting radical located on a different aromatic ring.

2. The process recited in claim 1, in which the disulfonyl halide is

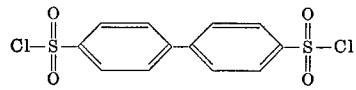

and the diamine is

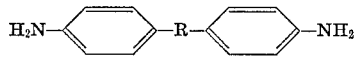

wherein R represents a divalent radical selected from the group consisting of oxygen, sulfonyl and aliphatic hydrocarbon radicals containing up to 5 carbon atoms.

3. A shaped article of the polysulfonamide of claim 1.

4. An all-aromatic polysulfonamide consisting essentially of the following recurring structural unit

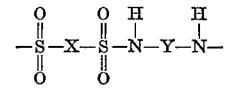

wherein X and Y are divalent aromatic radicals selected from the group consisting of

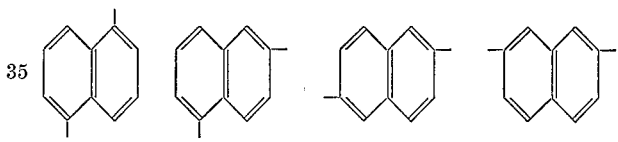

wherein R represents a divalent radical selected from the group consisting of oxygen, sulfonyl and aliphatic hydrocarbon radicals containing up to 5 carbon atoms and having an inherent viscosity greater than 0.7, measured at 30° C. using a solution containing 0.5 g. of the polymer per 100 cc. of N,N-dimethylformamide.

5. The all-aromatic polysulfonyl of claim 4 in which X is

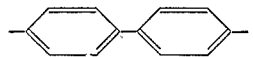

and Y is

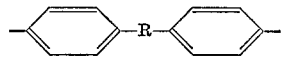

References Cited

UNITED STATES PATENTS

| | | | |
|---|---|---|---|
| 2,321,890 | 6/1943 | Berchet | 260—556 |
| 2,667,468 | 1/1954 | Jones et al. | 260—79.3 |
| 2,808,394 | 10/1957 | Speck | 260—79.3 |

WILLIAM H. SHORT, Primary Examiner

L. L. LEE, Assistant Examiner

U.S. Cl. X.R.

260—30.2, 30.8, 32.6, 79.3, 78

PO-1050
(5/69)

UNITED STATES PATENT OFFICE
CERTIFICATE OF CORRECTION

Patent No. 3,591,559          Dated July 6, 1971

Inventor(s) Stephanie Louise Kwolek

It is certified that error appears in the above-identified patent and that said Letters Patent are hereby corrected as shown below:

Column 6, line 23, Claim 3, "1" should be -- 4 --.

Signed and sealed this 2nd day of November 1971.

(SEAL)
Attest:

EDWARD M. FLETCHER, JR.          ROBERT GOTTSCHALK
Attesting Officer                Acting Commissioner of Patents